United States Patent
Shiao et al.

(10) Patent No.: US 10,848,855 B2
(45) Date of Patent: Nov. 24, 2020

(54) METHOD, ELECTRONIC DEVICE AND RECORDING MEDIUM FOR COMPENSATING IN-EAR AUDIO SIGNAL

(71) Applicant: HTC Corporation, Taoyuan (TW)

(72) Inventors: Yao Shiao, Taoyuan (TW); Shu-Hung Tseng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/429,064

(22) Filed: Jun. 3, 2019

(65) Prior Publication Data

US 2020/0059718 A1 Feb. 20, 2020

Related U.S. Application Data

(60) Provisional application No. 62/719,146, filed on Aug. 17, 2018.

(51) Int. Cl.
*H04R 1/22* (2006.01)
*G06N 3/02* (2006.01)

(52) U.S. Cl.
CPC ............... *H04R 1/225* (2013.01); *G06N 3/02* (2013.01)

(58) Field of Classification Search
CPC .... H04R 5/04; H04R 25/505; H04R 2225/43; G10L 19/008; G10L 19/00
USPC .................................. 381/314, 317, 320, 303
See application file for complete search history.

(56) References Cited

U.S. PATENT DOCUMENTS

| 2009/0034765 | A1* | 2/2009 | Boillot | H04R 1/1016 |
| | | | | 381/309 |
| 2014/0010378 | A1* | 1/2014 | Voix | G10L 21/0216 |
| | | | | 381/57 |
| 2015/0304782 | A1* | 10/2015 | Zurbrugg | H04R 25/407 |
| | | | | 381/328 |
| 2016/0351203 | A1 | 12/2016 | Tan et al. | |
| 2019/0166435 | A1* | 5/2019 | Crow | H04R 25/505 |

OTHER PUBLICATIONS

"Office Action of Taiwan Counterpart Application", dated Jul. 24, 2020, p. 1-p. 5.

* cited by examiner

*Primary Examiner* — Alexander Krzystan
(74) *Attorney, Agent, or Firm* — JCIPRNET

(57) ABSTRACT

A method, an electronic device, and a recording medium for compensating an in-ear audio signal are provided. The method is applicable to the electronic device having a processor. In the method, an in-ear audio signal transmitted through an inner ear when a user speaks is captured by using an in-ear microphone, and an outer audio signal transmitted through air when the user speaks is captured by using an outer microphone in a training stage. Then, a machine learning model of audio signals is established for an objective function and is trained by using the in-ear audio signal and the outer audio signal. Finally, the in-ear audio signal captured by the in-ear microphone is converted into a compensated audio signal by using the trained machine learning model in an online stage, and the compensated audio signal is output.

16 Claims, 7 Drawing Sheets

METHOD, ELECTRONIC DEVICE AND RECORDING MEDIUM FOR COMPENSATING IN-EAR AUDIO SIGNAL

CROSS-REFERENCE TO RELATED APPLICATION

This application claims the priority benefit of U.S. provisional application Ser. No. 62/719,146, filed on Aug. 17, 2018. The entirety of the above-mentioned patent application is hereby incorporated by reference herein and made a part of this specification.

BACKGROUND OF THE INVENTION

Field of the Invention

The disclosure relates to an audio signal conversion technique, and more particularly, to a method for compensating an in-ear audio signal, an electronic device having a function of compensating an in-ear audio signal, and a recording medium.

Description of Related Art

As technology constantly advances, personal electronic products have been developed to be light and miniaturized. At present, to reduce the size of the earphone and integrate both functions of emitting sound and collecting sound in the earphone, manufacturers dispose the earphone and the microphone in the same casing to design various wireless earphones with a microphone, and Bluetooth communication is adopted so that connection can be established between the wireless earphone with a microphone and other electronic devices. In addition, in noisy environments, the wireless earphone with a microphone may not be able to clearly collect the sound emitted from the user due to the ambient sounds. To prevent this from happening, some manufacturers adopt in-ear microphones to collect sounds emitted from the ear canal of the user.

However, the sound transmitted from the ear canal is the sound emitted from the vocal cords in the user's body and transmitted through various structures in the body such as the Eustachian tube. After the high frequency emitted by the vocal cords passes through these narrow tubes, the high frequency is easily attenuated because its energy is low. As a result, the sound appears muffled to us.

SUMMARY OF THE INVENTION

In view of the above, the invention provides a method, an electronic device, and a recording medium for compensating an in-ear audio signal, which can convert an in-ear audio signal transmitted through an inner ear when a user speaks into one that is close to an audio signal transmitted through air.

The invention provides a method for compensating an in-ear audio signal, which is applicable to an electronic device having a processor, wherein the electronic device is connected to an in-ear microphone disposed in an ear of a user and an outer microphone disposed outside the ear. The method includes the following steps. An in-ear audio signal transmitted through an inner ear when the user speaks is captured by using the in-ear microphone, and an outer audio signal transmitted through air when the user speaks is captured by using the outer microphone in a training stage. A machine learning model of audio signals is established for an objective function, and the machine learning model is trained by using the in-ear audio signal and the outer audio signal. The in-ear audio signal captured by the in-ear microphone is converted into a compensated audio signal by using the trained machine learning model in an online stage, and the compensated audio signal is output.

In an embodiment of the invention, the step of establishing the machine learning model of audio signals for the objective function, and training the machine learning model by using the in-ear audio signal and the outer audio signal includes the following steps. The in-ear audio signal is set as an input layer of the machine learning model, and the outer audio signal is set as an output layer of the machine learning model. The machine learning model is trained through the input layer and the output layer to extract an audio signal feature between the in-ear audio signal and the outer audio signal.

In an embodiment of the invention, the step of converting the in-ear audio signal captured by the in-ear microphone into the compensated audio signal by using the trained machine learning model in the online stage includes the following step. The in-ear audio signal is converted into the compensated audio signal by using the audio signal feature.

In an embodiment of the invention, the machine learning model includes a convolutional neural network (CNN) or a deep neural network (DNN).

In an embodiment of the invention, the step of establishing the machine learning model of audio signals for the objective function, and training the machine learning model by using the in-ear audio signal and the outer audio signal includes the following step. The objective function is set based on speech quality to establish and train a speech quality model, and/or the objective function is set based on a speech recognition rate to establish and train a speech recognition model.

In an embodiment of the invention, the method for compensating an in-ear audio signal further includes the following step. At least one of the trained speech quality model and the trained speech recognition model is determined to be used to convert the in-ear audio signal into the compensated audio signal according to an application executed by the electronic device in the online stage.

In an embodiment of the invention, in the method for compensating an in-ear audio signal, if the application executed by the electronic device involves a voice call, the in-ear audio signal is converted into the compensated audio signal by using the speech quality model.

In an embodiment of the invention, in the method for compensating an in-ear audio signal, if the application executed by the electronic device involves speech recognition, the in-ear audio signal is converted into the compensated audio signal by using the speech recognition model.

In an embodiment of the invention, the method for compensating an in-ear audio signal further includes the following step. Speech recognition is performed on the converted compensated audio signal, and a speech recognition result is output.

An electronic device of the invention includes a connection device, a storage device, and a processor. The connection device is connected to an in-ear microphone disposed in an ear of a user and an outer microphone disposed outside the ear. The storage device stores one or more commands. The processor is coupled to the connection device and the storage device and is configured to execute the commands to perform the following operations. An in-ear audio signal transmitted through an inner ear when the user speaks is captured by using the in-ear microphone, and an outer audio signal transmitted through air when the user speaks is captured by using the outer microphone in a training stage. A machine learning model of audio signals is established for an objective function, and the machine learning model is trained by using the in-ear audio signal and the outer audio signal. The in-ear audio signal captured by the in-ear microphone is converted into a compensated audio signal by using the trained machine learning model in an online stage, and the compensated audio signal is output.

The invention further provides a computer-readable recording medium, recording a program loaded into an electronic device to perform steps below. An in-ear audio signal transmitted through an inner ear when a user speaks is captured by using an in-ear microphone, and an outer audio signal transmitted through air when the user speaks is captured by using an outer microphone in a training stage. A machine learning model of audio signals is established for an objective function, and the machine learning model is trained by using the in-ear audio signal and the outer audio signal. The in-ear audio signal captured by the in-ear microphone is converted into a compensated audio signal by using the trained machine learning model in an online stage, and the compensated audio signal is output.

To make the aforementioned more comprehensible, several embodiments accompanied with drawings are described in detail as follows.

DESCRIPTION OF THE EMBODIMENTS

In the invention, objective functions are set for different applications of speech to establish a machine learning model, and the machine learning model is trained by using an in-ear audio signal transmitted through the inner ear of the user and an outer audio signal transmitted through air as parameters to obtain an audio signal feature between the in-ear audio signal and the outer audio signal. In an offline stage, the voice of the user is captured by an in-ear microphone, and a captured audio signal is input to the trained machine learning model for converting the captured audio signal into an output result close to the outer audio signal. Accordingly, the in-ear audio signal can be compensated to be close to an audio signal that is normally emitted by the user and transmitted through air.

Figure 1:
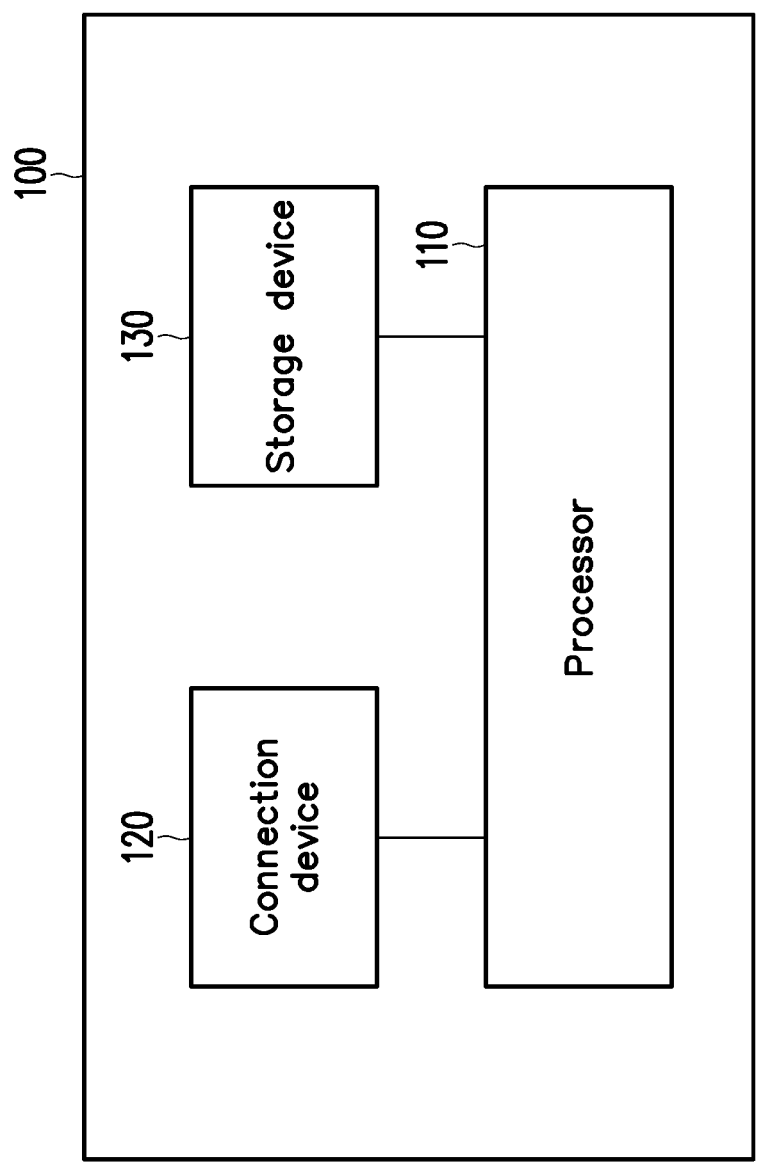
FIG. 1 is a block diagram showing an electronic device according to an embodiment of the invention.

FIG. 1 is a block diagram showing an electronic device according to an embodiment of the invention. Referring to FIG. 1, an electronic device 100 includes a processor 110, a connection device 120, and a storage device 130. The processor 110 is coupled to the connection device 120 and the storage device 130 and may access and execute the commands recorded in the storage device 130 to implement a method for compensating an in-ear audio signal of the embodiment of the invention.

In different embodiments, the processor 110 is, for example, a central processing unit (CPU), another programmable general-purpose or specific-purpose microprocessor, digital signal processor (DSP), programmable controller, application specific integrated circuit (ASIC), programmable logic device (PLD), another similar device, or a combination of the above devices, and the invention is not limited thereto.

The connection device 120 is connected to an in-ear microphone disposed in the ear of the user and an outer microphone disposed outside the ear of the user. Specifically, the connection device 120 may be connected to the in-ear microphone and the outer microphone through any wired or wireless method to receive audio signals captured by the in-ear microphone and the outer microphone. For example, the connection device 120 may be a communication interface such as Universal Serial Bus (USB), RS232, Bluetooth (BT), Wireless Fidelity (Wi-Fi), etc., and the invention is not limited thereto.

The storage device 130 is, for example, a fixed or movable random access memory (RAM), read-only memory (ROM), flash memory, hard disk of any type, another similar device, or a combination of the above devices and is configured to store one or more commands executable by the processor 110. These commands may be loaded into the processor 110 to be executed.

In the present embodiment, the electronic device 100 is connected to the in-ear microphone disposed in the ear of the user and the outer microphone disposed outside the ear of the user through the connection device 120. It is noted that the electronic device 100 may be an earphone device integrated with the in-ear microphone and the outer microphone, a device separate from the in-ear microphone and the outer microphone, or even a device integrated with only one of the in-ear microphone and the outer microphone. Specifically, the electronic device 100 is, for example, an earphone, a smartphone, a tablet computer, or another device that has computational functions, and the invention is not limited thereto.

Generally, the sound emitted by people when speaking is transmitted through two paths. One is that sound is emitted from the vocal cords and then transmitted through vibration of air outside the human body. The other is that sound is emitted from the vocal cords and then transmitted to the eardrum through the Eustachian tube inside the human body. In an embodiment of the invention, the outer microphone (not shown) is disposed outside the ear of the user and can capture an outer audio signal transmitted through air when the user speaks. The outer microphone is, for example, a directional microphone of a wireless Bluetooth earphone, a microphone of a wired earphone, a built-in microphone of a smartphone, or a similar device, and the invention is not limited thereto.

Figure 2:
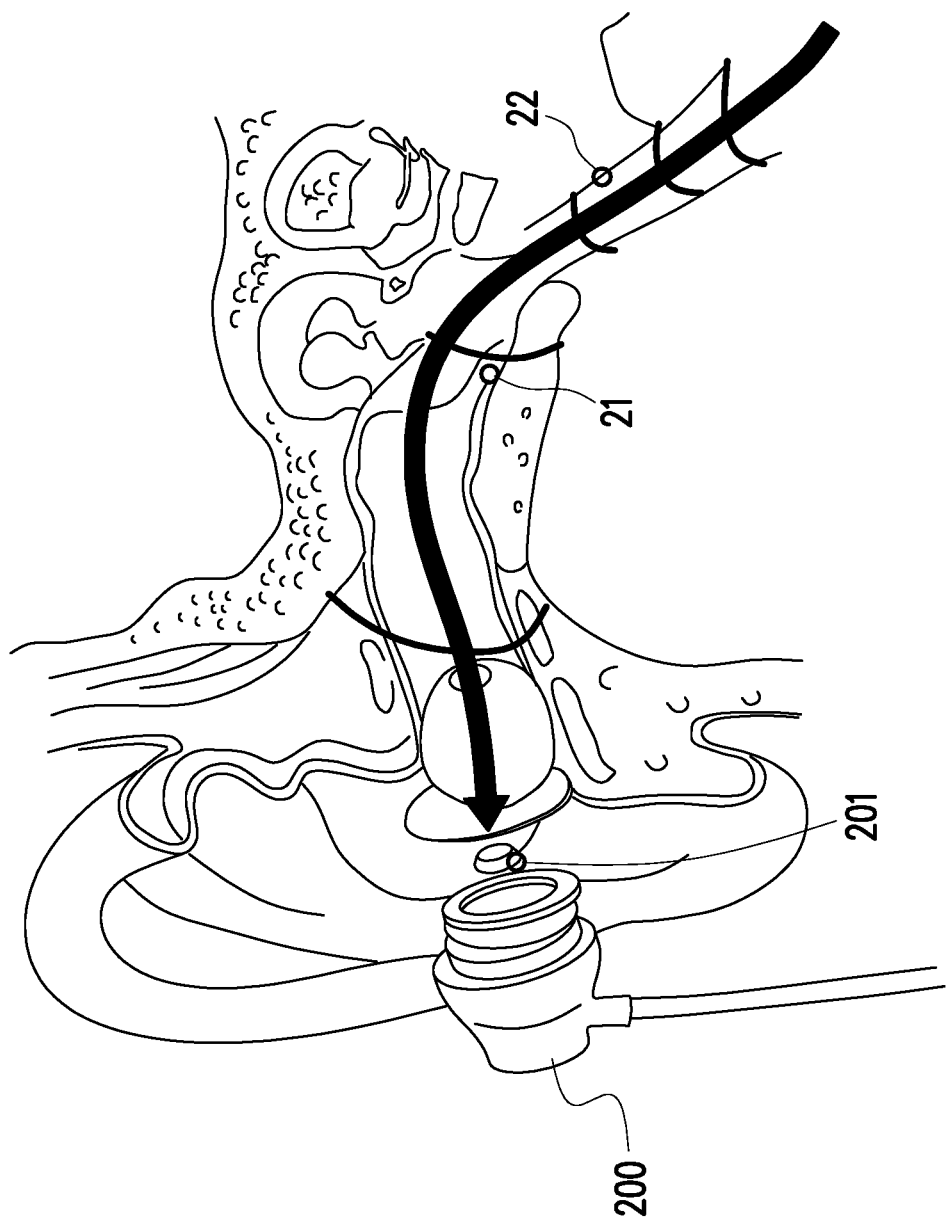
FIG. 2 is a schematic view showing acquisition of an in-ear audio signal according to an embodiment of the invention.

On the other hand, the in-ear microphone is disposed in the ear of the user and can capture an in-ear audio signal transmitted through the inner ear when the user speaks. FIG. 2 is a schematic view showing acquisition of an in-ear audio signal according to an embodiment of the invention. Referring to FIG. 2, taking an earphone 200 as an example, the earphone 200 includes an in-ear microphone 201. The in-ear microphone 201 is disposed at a position close to an ear cavity 21 of the user to receive the sound wave transmitted in the ear canal. The sound wave transmission path is as indicated by the arrow in FIG. 2. When the user speaks, the sound is emitted from the vocal cords and transmitted to the ear cavity 21 through a Eustachian tube 22, and the transmitted sound wave can be detected and captured by the in-ear microphone 201. However, when the sound is received by the in-ear microphone 201, since the sound passes through various parts of the human body, the sound captured by the in-ear microphone 201 is different from the sound that is normally emitted from the mouth of the user and transmitted through air. Generally, compared to the sound received by the outer microphone, the sound received by the in-ear microphone 201 is muffled, fuzzy, and lacks recognizability.

Figure 3A:
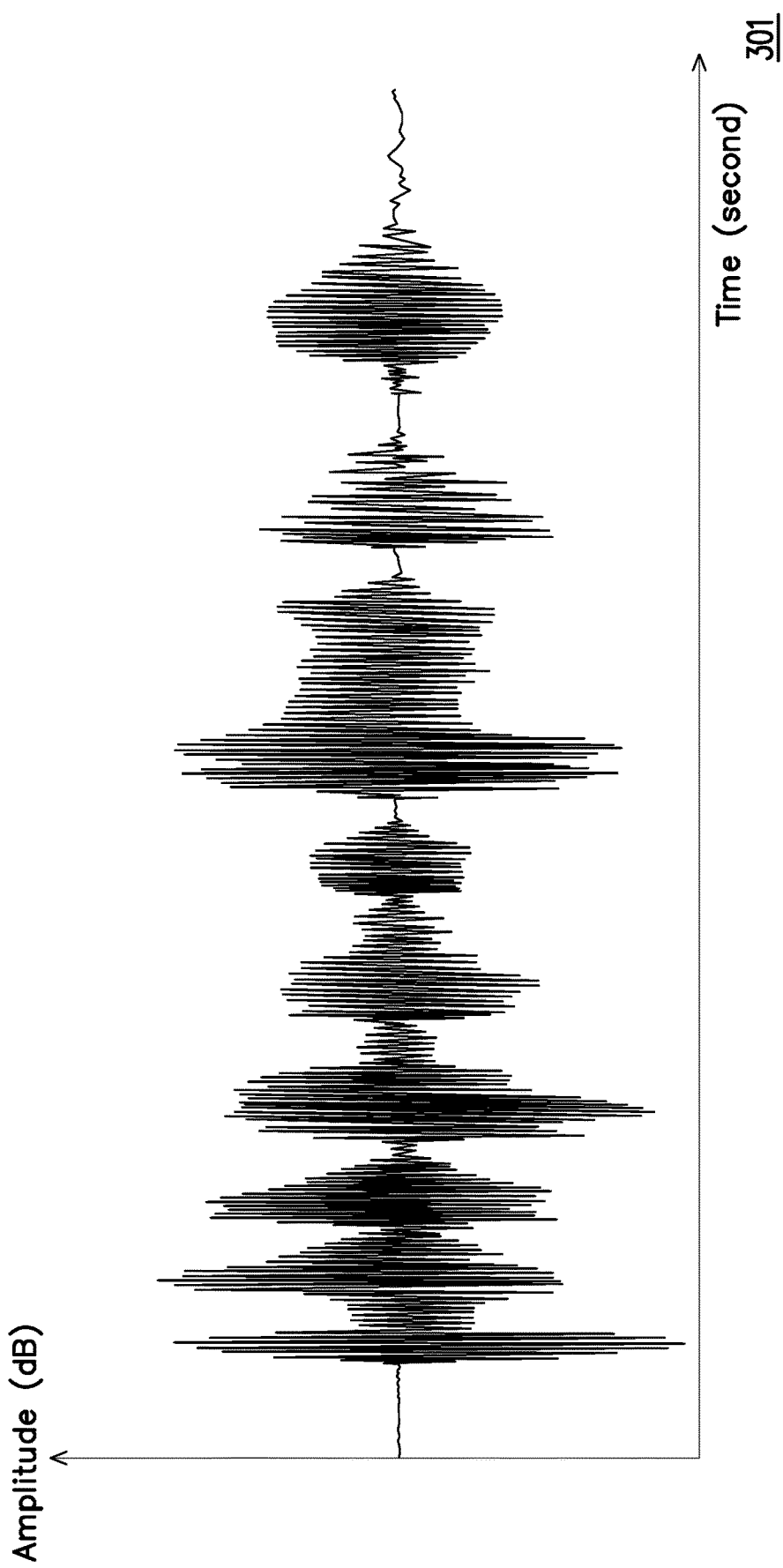
FIG. 3A shows an example of an outer audio signal according to an embodiment of the invention.
Figure 3B:
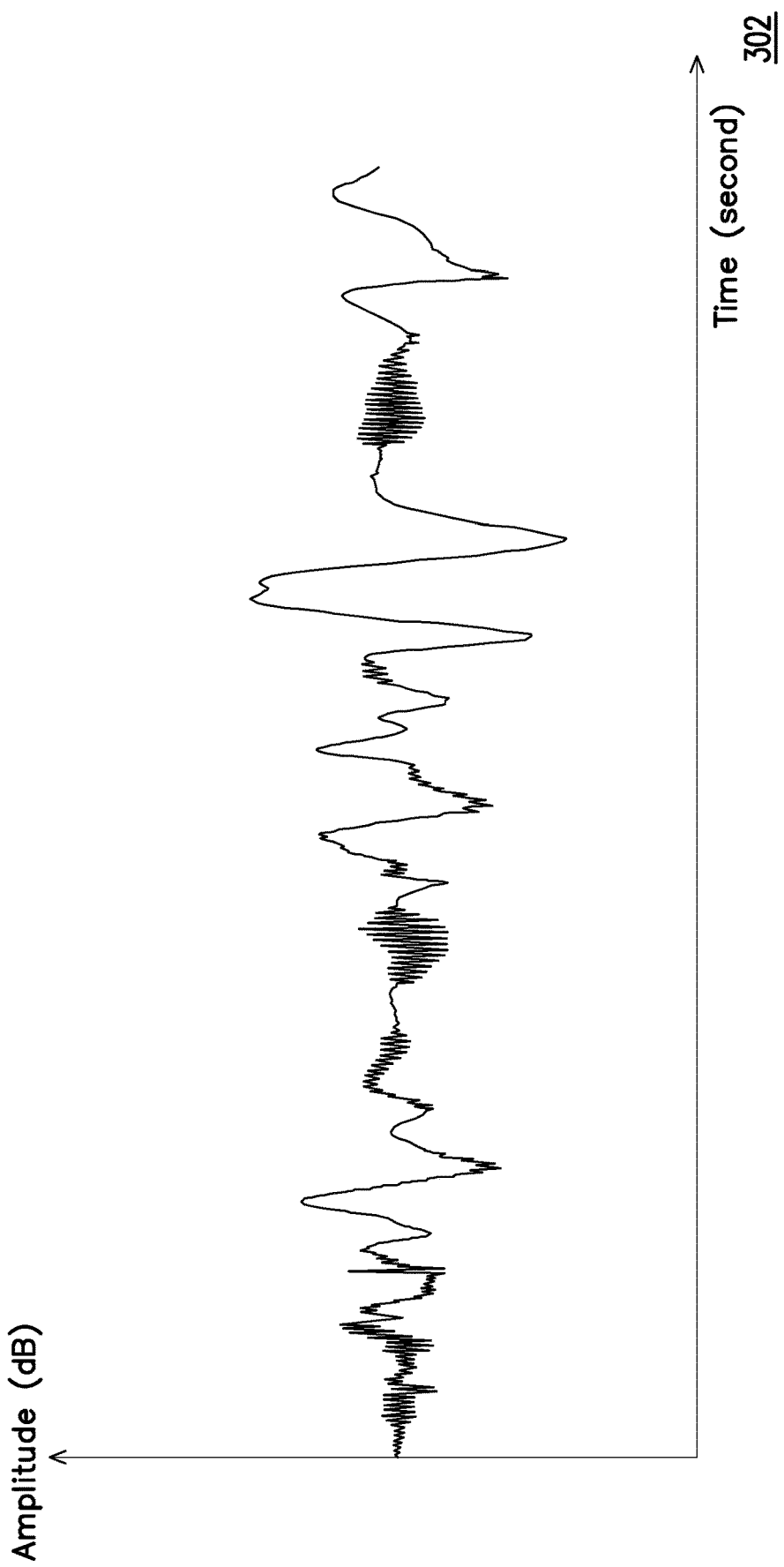
FIG. 3B shows an example of an in-ear audio signal according to an embodiment of the invention.

Referring to FIG. 3A and FIG. 3B for the difference between the sounds captured by the in-ear microphone and the outer microphone. FIG. 3A shows an example of an outer audio signal according to an embodiment of the invention. FIG. 3B shows an example of an in-ear audio signal according to an embodiment of the invention. Referring to FIG. 2, FIG. 3A, and FIG. 3B at the same time, FIG. 3A and FIG. 3B show a signal waveform 301 captured by the outer microphone (not shown) and a signal waveform 302 captured by the in-ear microphone 201 when the user speaks the same one sentence.

Figure 4:
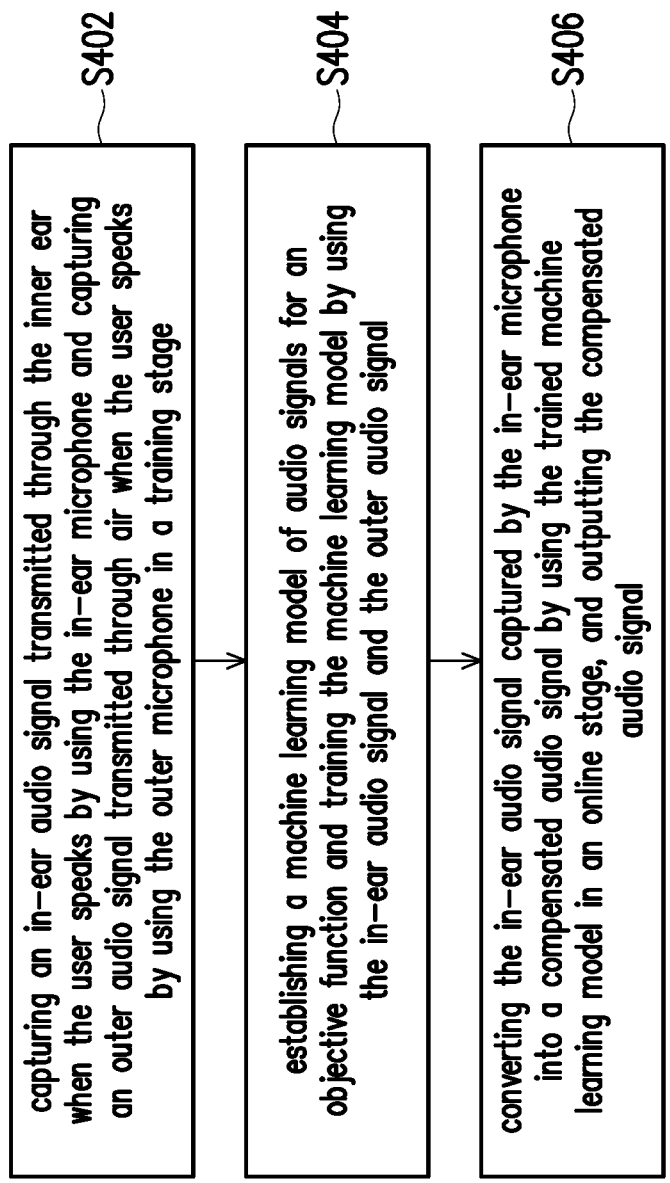
FIG. 4 is a flowchart showing a method for compensating an in-ear audio signal according to an embodiment of the invention.

FIG. 4 is a flowchart showing a method for compensating an in-ear audio signal according to an embodiment of the invention. Referring to FIG. 1 and FIG. 4 at the same time, the method of the present embodiment is applicable to the electronic device 100 above, and the detailed steps of the method for compensating the in-ear audio signal of the present embodiment will be described below with reference to the devices and components of the electronic device 100.

First, in a training stage, the processor 110 captures an in-ear audio signal transmitted through the inner ear when the user speaks by using the in-ear microphone and captures an outer audio signal transmitted through air when the user speaks by using the outer microphone (step S402).

Next, the processor 110 establishes a machine learning model of audio signals for an objective function and trains the machine learning model by using the in-ear audio signal and the outer audio signal (step S404). The processor 110 may set the objective function for different voice requirements. Specifically, the processor 110 sets the in-ear audio signal as an input layer of the machine learning model and sets the outer audio signal as an output layer of the machine learning model. Next, the processor 110 trains the machine learning model through the input layer and the output layer to extract an audio signal feature between the in-ear audio signal and the outer audio signal.

The machine learning model is, for example, a machine learning model established by using techniques such as a neural network. By using the parameter value corresponding to the in-ear audio signal as the input of the machine learning model and using the parameter value corresponding to the outer audio signal as the output of the machine learning model, the parameter values of each layer in the learning model can be trained. Taking the neural network as an example, numerous neurons and links are provided between the input layer and the output layer, and multiple hidden layers may be included. The number of nodes (neurons) in each layer is variable, and a larger number of nodes may be used to enhance the robustness of the neural network. In the present embodiment, the machine learning model is, for example, a convolutional neural network (CNN) or a deep neural network (DNN).

Finally, in an online stage, the processor 110 converts the in-ear audio signal captured by the in-ear microphone into a compensated audio signal by using the trained machine learning model and outputs the compensated audio signal (step S406). The processor 110 converts the in-ear audio signal into the compensated audio signal by using the audio signal feature extracted in the training stage.

In other embodiments, the above machine learning model of audio signals established for the objective function, whether for a speech recognition rate model or a speech quality model, may all be trained by using the in-ear signals of the left and right ears.

For example, the user often needs to use voice functions (e.g., the voice call function) when operating electronic products. When the user is in a noisy environment, using a noise-canceling earphone can block and reduce most of the external ambient sound. At this time, if the user wears an earphone having an in-ear microphone, the earphone can receive the sound from the inner ear of the user through the in-ear microphone when the user speaks. The in-ear audio signal received by this in-ear microphone is not only prevented from being interfered by the external environment, but the in-ear audio signal can also be converted into a compensated audio signal by using the trained machine learning model for use in the voice call.

Figure 3C:
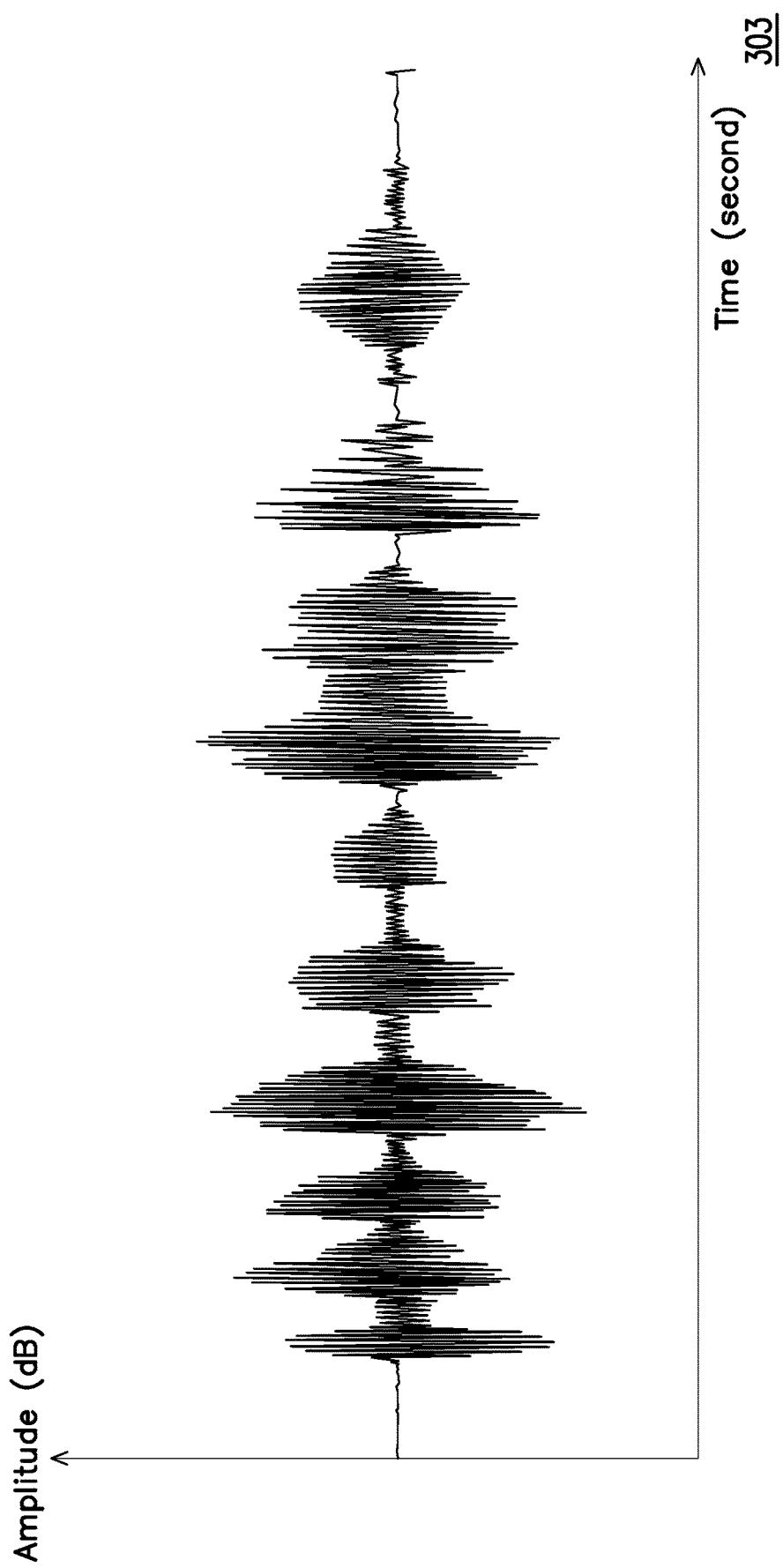
FIG. 3C shows an example of a compensated audio signal according to an embodiment of the invention.

FIG. 3C shows an example of a compensated audio signal according to an embodiment of the invention. Through the above method for compensating the in-ear audio signal, the trained machine learning model can convert the signal waveform 302 captured by the in-ear microphone in FIG. 3B into the signal waveform 303 in FIG. 3C. Accordingly, the audio signal captured by the in-ear microphone can be compensated to be close to an audio signal that is normally emitted by the user and transmitted through air.

Generally, the user's voice may be used in a voice call, a voice assistant, etc. In a voice call, the user's voice has to be clear and unmuffled so that the other party of the call can understand the content of the user's speech. In a voice assistant, the user's voice has to allow the application to identify who the speaker is through the voice, and the voice has to be undistorted (namely, the voice has to be recognizable). Therefore, according to another embodiment of the invention, the electronic device 100 may also set the objective function for different voice requirements and train the machine learning model according to different objective functions.

Figure 5:
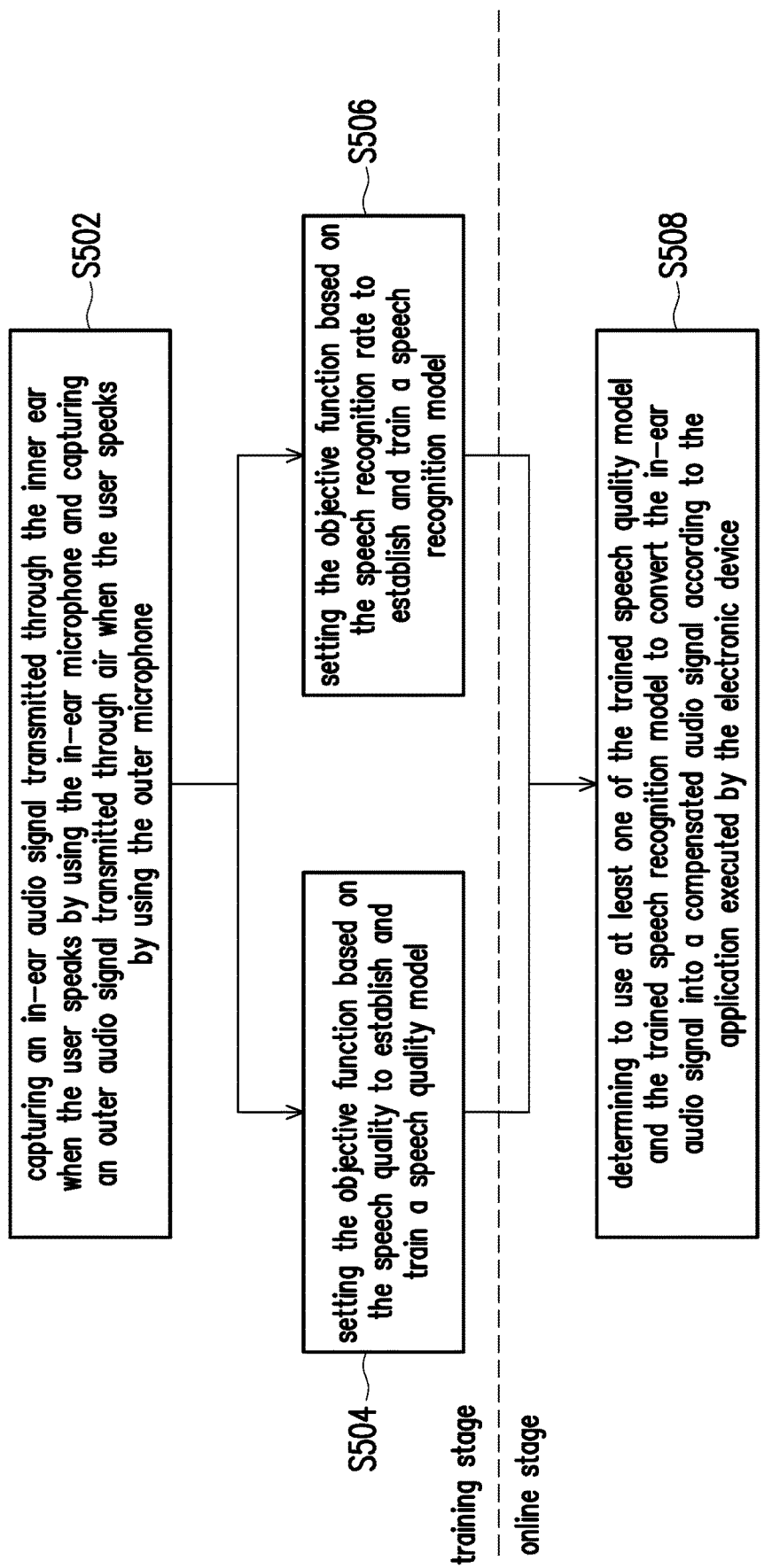
FIG. 5 is a flowchart showing determination of a method for compensating an in-ear audio signal according to an application according to an embodiment of the invention.

FIG. 5 is a flowchart showing determination of a method for compensating an in-ear audio signal according to an application according to an embodiment of the invention. Referring to FIG. 1 and FIG. 5 at the same time, the method of the present embodiment is applicable to the above electronic device 100.

First, in the training stage, the processor 110 captures an in-ear audio signal transmitted through the inner ear when the user speaks by using the in-ear microphone and captures an outer audio signal transmitted through air when the user speaks by using the outer microphone (step S502). Next, the processor 110 sets the objective function based on the speech quality to establish and train a speech quality model (step S504), and/or sets the objective function based on the speech recognition rate to establish and train a speech recognition model (step S506). Specifically, the processor 110 may respectively set the objective function of the machine learning model according to the speech quality and the speech recognition rate and respectively train the speech quality model and the speech recognition model by using the in-ear audio signal and the outer audio signal.

Finally, according to the application executed by the electronic device 100, the processor 110 determines to use at least one of the trained speech quality model and the trained speech recognition model to convert the in-ear audio signal into a compensated audio signal (step S508). The processor 110 of the electronic device 100 may execute various applications (e.g., a voice call, a voice assistant, etc.) which require acquisition and use of the user's voice. Whenever the user selects and starts the application on the electronic device 100, the processor 110 determines the type of the application being started to thereby select a machine learning model suitable for the type to convert the audio signal captured from the user, so as to obtain a compensated audio signal suitable for the type of the application.

In an embodiment, if the application executed by the processor 110 involves a voice call, the processor 110 converts the in-ear audio signal into the compensated audio signal by using the speech quality model. For example, when the user uses the application "telephone" to transmit voice to the other party of the call, the processor 110 converts the in-ear audio signal captured by the in-ear microphone by using the speech quality model to compensate the in-ear audio signal to be an audio signal having good speech quality.

In another embodiment, if the application executed by the processor 110 involves speech recognition, the processor 110 converts the in-ear audio signal into a compensated audio signal by using the speech recognition model. For example, when the user uses the application "voice assistant", the processor 110 converts the in-ear audio signal captured by the in-ear microphone by using the speech recognition model to compensate the in-ear audio signal to be an audio signal having good speech recognizability. The processor 110 further performs speech recognition on the converted compensated audio signal and outputs a speech recognition result. With the audio signal having recognizability, the processor 110 can properly execute the "voice assistant" to identify the speaking user and recognize the content of the user's speech.

The invention further provides a non-transitory computer-readable recording medium which records a computer program. The computer program is configured to execute each of the steps of the above method for compensating the in-ear audio signal. The computer program is composed of multiple code segments (e.g., an organization chart establishing code segment, a table approving code segment, a setting code segment, and a deployment code segment), and after the code segments are loaded into the processor and executed, the steps of the above method for compensating the in-ear audio signal are completed.

In summary of the above, in the method for compensating the in-ear audio signal and the electronic device provided in the invention, by using the in-ear audio signal transmitted through the inner ear of the user and the outer audio signal transmitted through air as parameters, the objective function is set for different voice requirements to establish and train the machine learning model. By compensating the audio signal recorded by the in-ear microphone by using the trained machine learning model, the invention can compensate the in-ear audio signal to be close to an audio signal that is normally emitted by the user and transmitted through air. Accordingly, the electronic device can obtain audio signals having high speech quality or high recognizability even in noisy environments. Moreover, clear audio signals can be obtained without requiring the user to speak loudly.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for compensating an in-ear audio signal, which is applicable to an electronic device having a processor, wherein the electronic device is connected to an in-ear microphone disposed in an ear of a user and an outer microphone disposed outside the ear, the method comprising:
   capturing an in-ear audio signal transmitted through an inner ear when the user speaks by using the in-ear microphone, and capturing an outer audio signal transmitted through air when the user speaks by using the outer microphone in a training stage;
   establishing a machine learning model of audio signals for an objective function, and training the machine learning model by using the in-ear audio signal and the outer audio signal, comprising:
      setting the in-ear audio signal as an input to an input layer of the machine learning model, and setting the outer audio signal as an input to an output layer of the machine learning model; and
      training the machine learning model through the input layer and the output layer to extract an audio signal feature between the in-ear audio signal and the outer audio signal; and
   converting an online stage in-ear audio signal captured by the in-ear microphone into a compensated audio signal by using the extracted audio signal feature between the in-ear audio signal and the outer audio signal in an online stage, and outputting the compensated audio signal.

2. The method for compensating an in-ear audio signal according to claim 1, wherein the machine learning model comprises a convolutional neural network (CNN) or a deep neural network (DNN).

3. The method for compensating an in-ear audio signal according to claim 1, wherein the step of establishing the machine learning model of audio signals for the objective function, and training the machine learning model by using the in-ear audio signal and the outer audio signal comprises:
   setting the objective function based on speech quality to establish and train a speech quality model, and/or setting the objective function based on a speech recognition rate to establish and train a speech recognition model.

4. The method for compensating an in-ear audio signal according to claim 3, further comprising:
   determining to use at least one of the trained speech quality model and the trained speech recognition model to convert the in-ear audio signal into the compensated audio signal according to an application executed by the electronic device in the online stage.

5. The method for compensating an in-ear audio signal according to claim 4, wherein if the application executed by the electronic device involves a voice call, the in-ear audio signal is converted into the compensated audio signal by using the speech quality model.

6. The method for compensating an in-ear audio signal according to claim 4, wherein if the application executed by the electronic device involves speech recognition, the in-ear audio signal is converted into the compensated audio signal by using the speech recognition model.

7. The method for compensating an in-ear audio signal according to claim 6, further comprising:
   performing speech recognition on the converted compensated audio signal, and outputting a speech recognition result.

8. An electronic device comprising:
   a connection device, connected to an in-ear microphone disposed in an ear of a user and an outer microphone disposed outside the ear;
   a storage device, storing one or more commands; and
   a processor, coupled to the connection device and the storage device, configured to execute the commands to:
      capture an in-ear audio signal transmitted through an inner ear when the user speaks by using the in-ear microphone, and capture an outer audio signal transmitted through air when the user speaks by using the outer microphone in a training stage;
      establish a machine learning model of audio signals for an objective function, and train the machine learning model by using the in-ear audio signal and the outer audio signal, wherein the processor is configured to set the in-ear audio signal as an input to an input layer of the machine learning model, set the outer audio signal as an input to an output layer of the machine learning model, and train the machine learning model through the input layer and the output layer to extract an audio signal feature between the in-ear audio signal and the outer audio signal; and
      convert an online stage in-ear audio signal captured by the in-ear microphone into a compensated audio signal by using the extracted audio signal feature between the in-ear audio signal and the outer audio signal in an online stage, and output the compensated audio signal.

9. The electronic device according to claim 8, wherein the machine learning model comprises a convolutional neural network or a deep neural network.

10. The electronic device according to claim 8, wherein the processor is configured to set the objective function based on speech quality to establish and train a speech quality model, and/or set the objective function based on a speech recognition rate to establish and train a speech recognition model.

11. The electronic device according to claim 10, wherein the processor is further configured to execute an application.

12. The electronic device according to claim 11, wherein the processor is further configured to determine to use at least one of the trained speech quality model and the trained speech recognition model to convert the in-ear audio signal into the compensated audio signal according to the application executed by the processor in the online stage.

13. The electronic device according to claim 12, wherein if the application executed by the processor involves a voice call, the in-ear audio signal is converted into the compensated audio signal by using the speech quality model.

14. The electronic device according to claim 12, wherein if the application executed by the processor involves speech recognition, the in-ear audio signal is converted into the compensated audio signal by using the speech recognition model.

15. The electronic device according to claim 14, wherein the processor is further configured to perform speech recognition on the converted compensated audio signal, and output a speech recognition result.

16. A computer-readable recording medium, recording a program loaded into a processor to perform steps below:
   capturing an in-ear audio signal transmitted through an inner ear when a user speaks by using an in-ear microphone, and capturing an outer audio signal transmitted through air when the user speaks by using an outer microphone in a training stage;
   establishing a machine learning model of audio signals for an objective function, and training the machine learning model by using the in-ear audio signal and the outer audio signal, comprising:
      setting the in-ear audio signal as an input to an input layer of the machine learning model, and setting the outer audio signal as an input to an output layer of the machine learning model; and
      training the machine learning model through the input layer and the output layer to extract an audio signal feature between the in-ear audio signal and the outer audio signal; and
   converting an online stage in-ear audio signal captured by the in-ear microphone into a compensated audio signal by using the extracted audio signal feature between the in-ear audio signal and the outer audio signal in an online stage, and outputting the compensated audio signal.

* * * * *